(12) United States Patent
Wilson

(10) Patent No.: US 6,421,747 B1
(45) Date of Patent: Jul. 16, 2002

(54) METHOD FOR MAXIMIZING BUFFER USAGE ON A DISK DRIVE

(75) Inventor: Aaron Wade Wilson, Berthoud, CO (US)

(73) Assignee: STMicroelectronics N.V. (NL)

( * ) Notice: Subject to any disclaimer, the term of this patent is extended or adjusted under 35 U.S.C. 154(b) by 0 days.

(21) Appl. No.: 09/257,391

(22) Filed: Feb. 25, 1999

Related U.S. Application Data (60) Provisional application No. 60/076,168, filed on Feb. 27, 1998.

(51) Int. Cl.[7] .................................................. G06F 3/06
(52) U.S. Cl. ......................................... 710/56; 711/170
(58) Field of Search ................................ 711/170, 173, 711/171, 172; 710/52, 56

(56) References Cited

U.S. PATENT DOCUMENTS

| | | | |
|---|---|---|---|
| 5,386,536 A | * | 1/1995 | Courts et al. ............... 711/136 |
| 5,537,635 A | * | 7/1996 | Douglas ..................... 711/129 |
| 5,640,604 A | * | 6/1997 | Hirano ........................ 710/56 |
| 5,860,131 A | * | 1/1999 | Daub ......................... 711/170 |
| 5,875,349 A | * | 2/1999 | Cornaby et al. ............... 710/5 |

* cited by examiner

Primary Examiner—Hiep T. Nguyen
(74) Attorney, Agent, or Firm—Lisa K. Jorgenson; William J. Kubida (57) ABSTRACT

A method for maximizing buffer usage in a disk drive system. Control circuitry within the disk drive system tansfers the defective sector list for the disk to a buffer, and places the list in a reserved list area. The size of the defective sector list is then determined and the reserved list area is reduced to a size equal to the size of the defective sector list plus some spare room. If the newly sized reserved list area is not at one end of the buffer, it is then moved to one end of the buffer to leave the remainder of the buffer as a contiguous and expanded reserved user area for use data. The expanded reserved user area reduces the time of read or write operations in a disk drive.

29 Claims, 5 Drawing Sheets

METHOD FOR MAXIMIZING BUFFER USAGE ON A DISK DRIVE

This application claims priority from U.S. Provisional Patent Application No. 60/076,168, filed on Feb. 27, 1998, the contents of which are incorporated herein by reference.

FIELD OF THE INVENTION

The present invention relates to the field of disk drives, and in particular, to a system for maximizing use of a data buffer that stores a defective sector list.

BACKGROUND OF THE INVENTION

Most personal computers include at least one disk drive system for storing data in a non-volatile manner, so that the data is not lost when the personal computer is turned off or loses power. From the perspective of the disk drive system this data is known as user data. Existing disk drive systems store user data in data sectors on the recording surface of the disk or disks in the disk drive system. Because some of the data sectors may be determined to be defective by the manufacturer (or during use), a list of the defective data sectors is stored on the disk. The disk drive system maintains the defective sector list so that the defective data sectors can be avoided during normal disk drive operations.

The disk drive system includes control circuitry that handles user data transfers between the user (the personal computer) and the disk device. The control circuitry receives the user data from the user and stores the user data in a buffer. The control circuitry then retrieves the user data from the buffer and forwards the user data to the disk device. When the user data is subsequently read from the disk device, the control circuitry retrieves the user data from the disk device, and stores the user data in the buffer. The control circuitry then retrieves the user data from the buffer and forwards the user data to the user.

Among other things, the buffer compensates for the different data transfer rates of the user and the disk device. For example, the user may transfer user data to the control circuitry faster than the disk device can store the user data. The control circuitry temporarily stores the user data in the buffer to give the disk device time to store the user data. In addition, the buffer may already store some user data when it is requested by the user. The control circuitry immediately transfers this user data from the buffer to the user without expending the additional time to retrieve the user data from the disk device.

A processor within the control circuitry executes instructions to control the operation of the disk drive system. In some systems, the instructions are stored in a memory within the control circuitry. Upon system start-up, the processor retrieves and executes instructions from the memory to initiate operation of the disk drive system. One of the instructions executed by the processor causes the defective sector list to be transferred from the disk device to the same buffer as where the user data transfers are stored. The processor uses the defective sector list stored in the buffer to avoid using the defective data sectors on the disk device.

Prior to the transfer of the defective sector list to the buffer, the processor is unaware of the actual size of the defective sector list. Therefore, the processor must reserve enough buffer space to hold the maximum possible size of the defective sector list. If the actual size of the list is less than the reserved buffer space, extra buffer space is reserved that need not be reserved. Thus, the defective sector list uses up valuable buffer memory that is not available to store user data transfers.

A reduction in the buffer memory that is reserved for user data transfers adversely affects system performance because additional read/write operations are required to transfer the same amount of user data. Also, there is an increase in the likelihood of buffer overflows that stop data transfers. The reduction in buffer memory for data transfers also decreases the likelihood that user data is already in the buffer memory when it is requested by the user. As can be appreciated, disk drive systems could operate faster if a technique were provided to reduce the buffer memory used by the defective sector list. This reduction in buffer memory reserved for the list could improve system performance by enlarging the buffer memory that is available for user data transfers.

It is against this background and the problems of the prior art that the present invention has been developed.

SUMMARY OF THE INVENTION

The invention overcomes the above problems by reducing the buffer memory that is reserved for the defective sector list and enlarging the buffer memory that is reserved for user data transfers. The disk drive system performs faster, efficient user data transfers because the reserved area in the buffer for user data transfers is enlarged.

The invention comprises methods, systems, and processor-readable mediums for use in disk drive systems. Control circuitry retrieves a defective sector list from a disk device and stores the defective sector list in a buffer. The control circuitry determines a list size of the defective sector list stored in a reserved list area in the buffer. The control circuitry then determines a new size of the reserved list area based on the list size of the defective sector list. The control circuitry reduces the reserved list area based on the new size of the reserved list area. The control circuitry then enlarges a reserved user area in the buffer based on the new size of the reserved list area wherein the reserved user area stores the user data. The instructions that cause the control circuitry to carry out the above-described process are stored in a memory.

The invention provides a distinct advance in the art by enlarging the buffer memory that is reserved for user data transfers. The increase in the buffer memory for user data transfers improves system performance in numerous ways. First, the average number of read/write operations that are required to transfer a given amount of user data are decreased. Second, the likelihood of buffer overflows is reduced because more user data can be stored within the buffer. Third, when the user data is requested by the user, the likelihood that user data is already in the buffer is greater. Therefore, the user data can be immediately transferred to the user from the buffer without additional read or write operations.

BRIEF DESCRIPTION OF THE DRAWINGS

A particular reference number in one figure refers to the same element in all of the other figures.

DETAILED DESCRIPTION OF THE INVENTION

Figure 1:
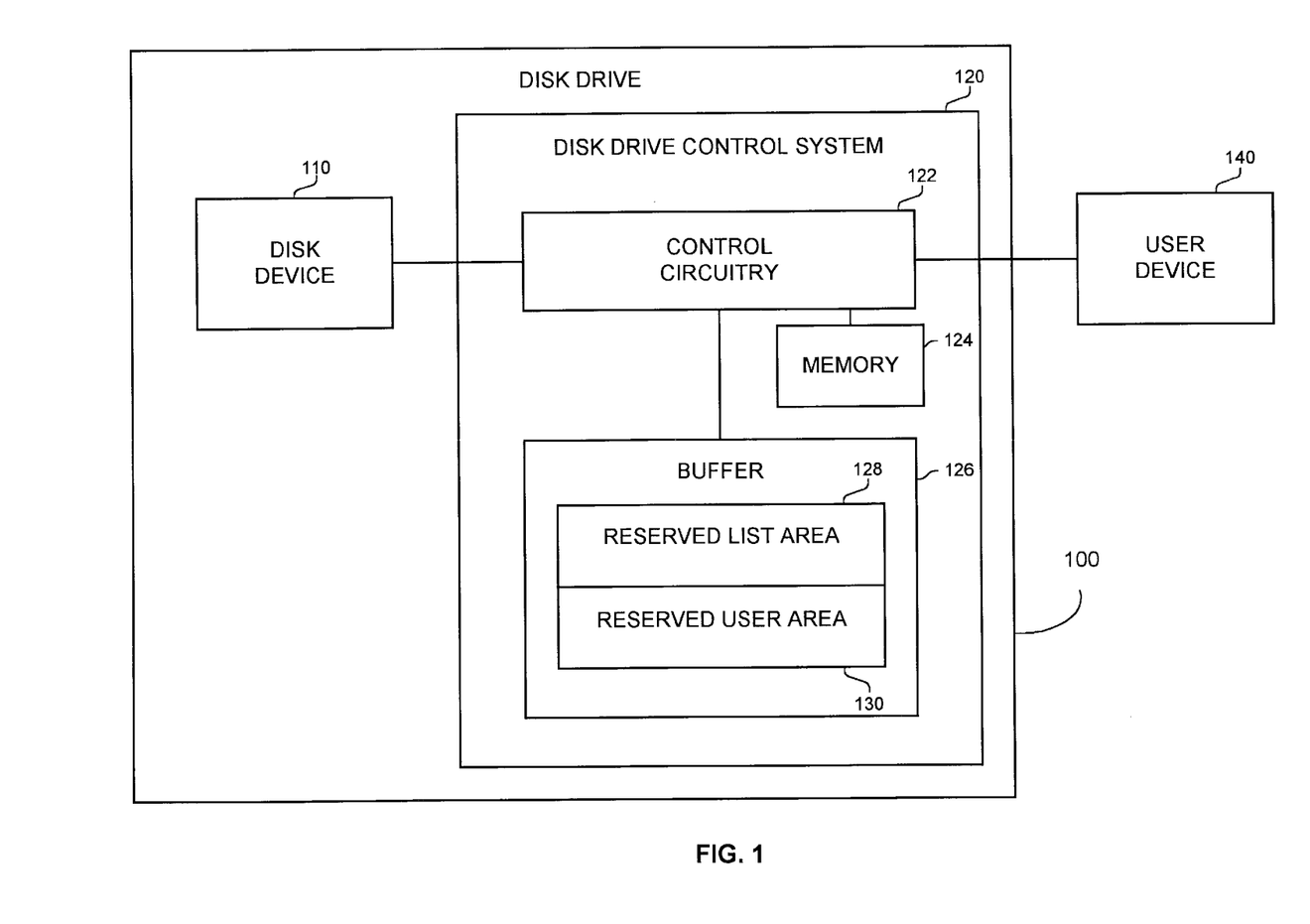
FIG. 1 is a block diagram for a disk drive in an example of the invention.

Disk Drive Architecture—FIG. 1

FIG. 1 depicts a disk drive system 100 in accord with the present invention that stores data for a user device 140, such as a personal computer. The disk drive system 100 includes a disk device 110 and a disk drive control system 120. Those skilled in the art are aware that numerous conventional aspects of the disk drive system 100 are not shown for the sake of clarity. The disk drive control system 120 includes control circuitry 122, a memory 124, and a buffer 126. The control circuitry 122 is connected to the disk device 110, the memory 124, the buffer 126, and to a user device 140.

The user device 140 transmits instructions to the control circuitry 122 to read or write user data from or to the disk device 110 and also exchanges user data with the control circuitry 122.

The disk device 110 stores user data in sectors on disks. One example of the disk device 110 is a conventional magnetic disk system. Typically, the disk device 110 receives control signals from the control circuitry 122 to position read/write heads over the sectors.

The control circuitry 122 is comprised of integrated circuitry that typically includes a processor, servo controller, memory controller, disk controller, read/write channel, disk drive interface, and user device interface. The processor executes instructions stored in the memory 124 to control the operation of the disk drive system 100. The control circuitry 122 receives instructions from the user device 140 to read or write data from or to the disk device system 110. The control circuitry 122 then exchanges data between the disk device 110 and the user device 140. During the exchange, the control circuitry 122 stores the data in the buffer 126. The buffer 126 stores this user data in an area in the buffer 126 designated for user data, known as the reserved user area 130.

The disk device 110 typically has defective sectors and stores a list of the defective sectors so they can be avoided. On the initial spin of the disk in the disk device 110, the defective sector list is read and transferred to the control circuitry 122. The control circuitry 122 stores the defective sector list in an area in the buffer 126 initially designated for defective sector list data, known as a reserved list area 128. The control circuitry 122 then uses the defective sector list stored in the reserved list area 128 to avoid any defective sectors during read or write operations.

Generally, in a write operation, the user device 140 transmits an instruction to the control circuitry 122 to write user data to the disk device 110. The user device 140 also transmits the user data to the control circuitry 122. The control circuitry 122 stores the user data in the reserved user area 130 in the buffer 126. The control circuitry 122 then controls the disk device 110 to position read/write heads over the proper sector. When the heads are properly positioned, the control circuitry 122 transfers the user data from the reserved user area 130 to the disk device 110. The disk device 110 then writes the user data to the disks.

Generally, in a read operation, the user device 140 transmits an instruction to the control circuitry 122 to read user data from the disk device 110. Upon receipt of the read instruction, the control circuitry 122 controls the disk device 110 to position read/write heads over the proper sector and read the data. As the data is being read, the control circuitry 122 stores the user data in the reserved user area 130 in the buffer 126. The control circuitry 122 then transfers the user data from the reserved user area 130 to the user device 140.

Figure 2A:
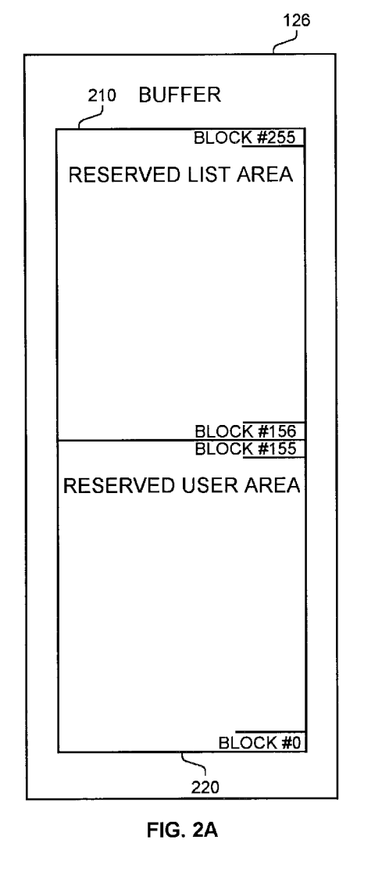
FIGS. 2A–2C are block diagrams for a buffer in an example of the invention.
Figure 2B:
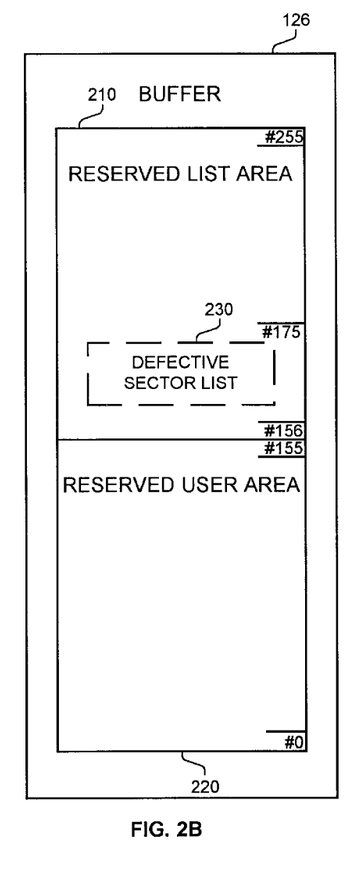
Figure 2C:
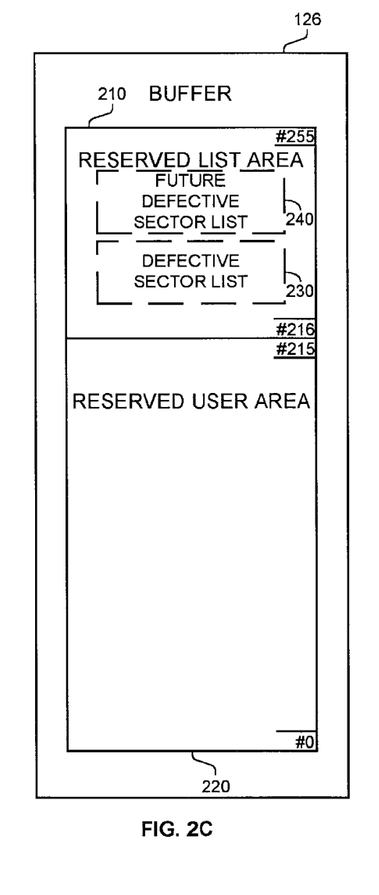

Buffer Resizing and Repositioning Example—FIGS. 2A–2C

FIGS. 2A–2C illustrate three different states of the buffer 126 during a read or write operation. For purposes of this example, the resolution of buffer reservations and defective sector list sizes is a 512 byte buffer block. A total of 256 buffer blocks are available for a total of 128 kilobytes. A reserved list area 210 is reserved to store a defective sector list 230. A reserved user area 220 is available for caching operations between the user device 140 and the disk device 110.

FIG. 2A depicts the buffer 126 prior to the defective sector list 230 being transferred from the disk device 110. The buffer 126 includes the reserved list area 210 and the reserved user area 220. The reserved user area 220 begins at block #0 and ends at block #155 for a total of 156 blocks. The reserved list area 210 begins at block #156 and ends at block #255 for a total of 100 blocks. The control circuitry 122 reserves 100 blocks because that is the maximum possible size of the defective sector list in the present example.

FIG. 2B depicts the buffer 126 after the defective sector list 230 is transferred from the disk device 110. The reserved list area 210 now contains the defective sector list 230. In this example, the defective sector list 230 only occupies 20 blocks in the reserved list area 210, from block #156 through block #175. Thus, 80 blocks remain unused in the reserved list area 210.

FIG. 2C depicts the buffer 126 after the invention is applied to dynamically resize the reserved areas 210 and 220 and reposition the defective sector list 230. In FIG. 2C, the buffer 126 includes the reserved user area 220 and the reserved list area 210. The reserved list area 210 begins at block #216 and ends at block #255 for a total of 40 blocks. The reserved list area 210 contains the defective sector list 230 and the future defective sector list 240. The future defective sector list 210 is for additional entries that may later be added to the list 230. For this example, the size of the future defective sector list 240 is 20 blocks. The number of blocks reserved for future defective sectors could be programmable or user defined. In some cases, the reserved area may typically be only two blocks. The size of the defective sector list 210 remains unchanged at 20 blocks. The control circuitry 122 reduces the reserved list area from 100 blocks in FIG. 2B to 40 blocks in FIG. 2C. The control circuitry 122 moves the defective sector list 230 to the resized reserved list area 210. The control circuitry 122 enlarges the reserved user area 220 by the remaining, unused 60 blocks. The reserved user area 220 begins at block #0 and ends at block #215 for a total of 216 blocks. The enlargement of 60 blocks in the reserved user area 220 increases the area in the buffer 126 for caching operations. Thus, disk drive performance is improved by the increase in buffer space reserved for the user.

For purposes of this example, the reserved list area 210 is located at higher buffer addresses than the reserved user area 220. However, this same invention is applicable to the buffer 126 where the reserved list area 210 is located at the lowest address of the buffer 126. In such case, repositioning the defective sector list 230 would not be required.

Figure 3:
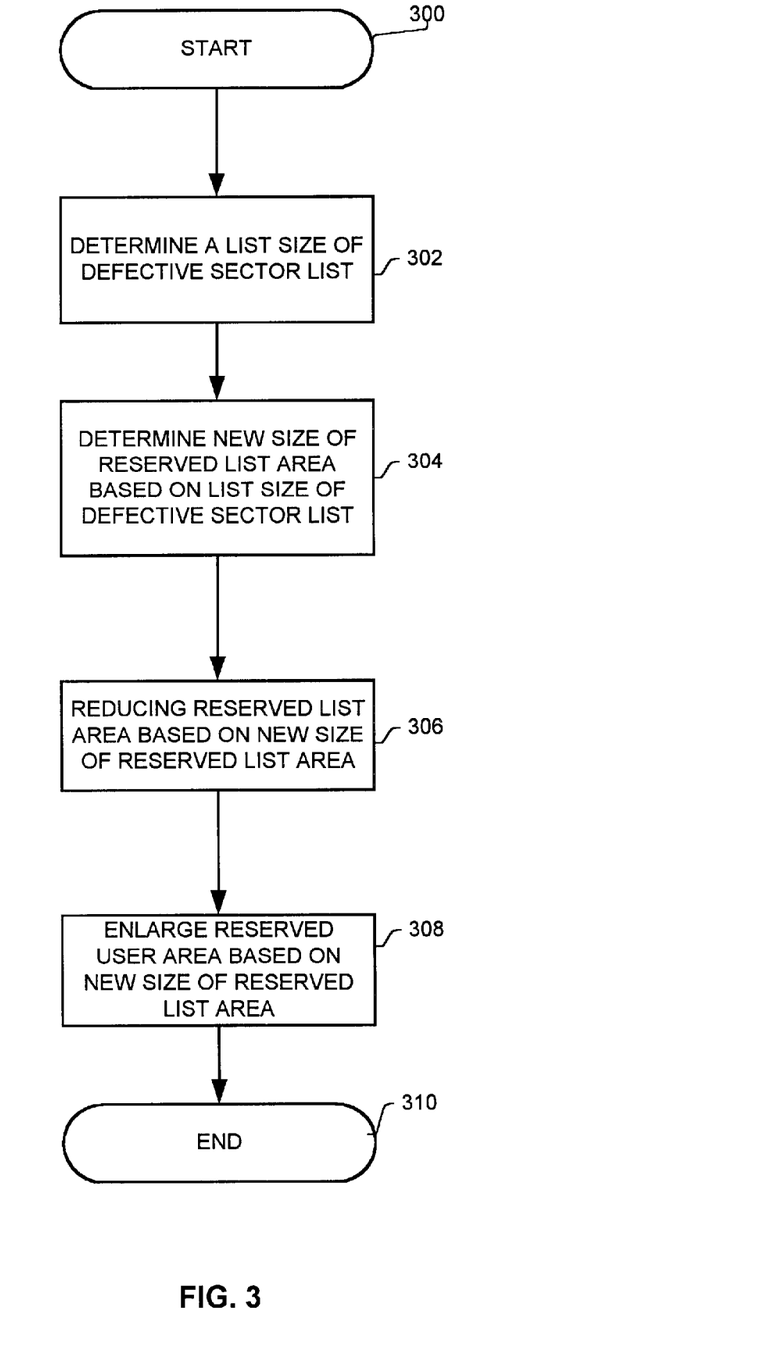
FIG. 3 is a flow chart of one embodiment of the invention for resizing reserved areas in the buffer in an example of the invention.
Figure 4:
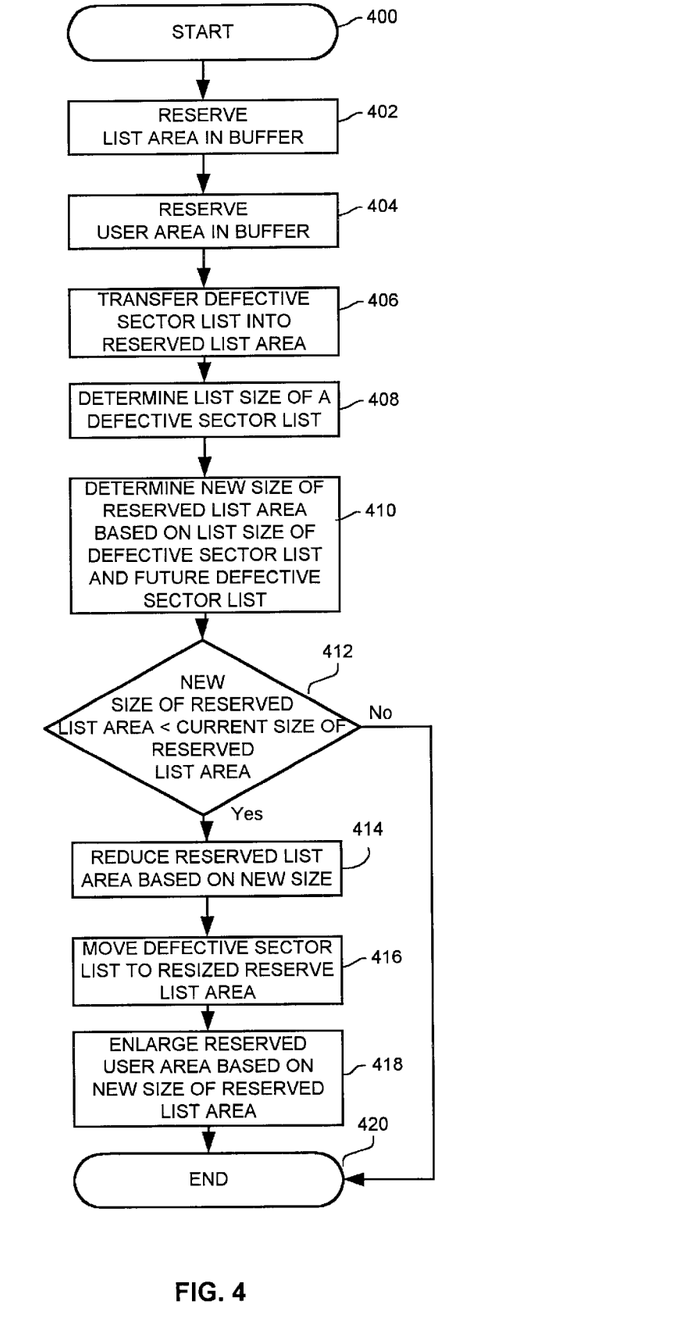
FIG. 4 is a flow chart of one embodiment of the invention for resizing reserved areas in the buffer in an example of the invention.

Buffer Resizing and Repositioning Flow Charts—FIGS. 3–4

FIG. 3 illustrates the operational steps to resize the reserved areas 210 and 220 within the buffer 126 in accord with one embodiment of the present invention. The process begins at step (300). At step (302), the control circuitry 122 determines a list size of the defective sector list 230 stored in the reserved list area 210 in the buffer 126. At step (304), the control circuitry 122 then determines the new size of the reserved list area 210 based on the list size of the defective sector list 230. The control circuitry 122 then reduces the reserved list area 210 based on the new size of the reserved list area 210 at step (306). At step (308), the control circuitry 122 enlarges the reserved user area 220 based on the new size of the reserved list area 210. The routine then ends (310). In this embodiment, the reserved user area 220 is increased by the unused portion of the reserved list area 210.

FIG. 4 illustrates the operational steps to resize the reserved areas 210 and 220 and reposition the defective sector list 230 within the buffer 126 in accord with one embodiment of the present invention. The process begins at step (400). At step (402), the control circuitry 122 reserves the reserved list area 210 in the buffer 126. At step (404), the control circuitry 122 reserves the reserved user area 220 in the buffer 126. Prior to any read or write operation, the control circuitry 122 transfers the defective sector list 230 into the reserved list area 210 from the disk device 110 at step (406). The control circuitry 122 determines a list size of the defective sector list 230 at step (408). At step (410), the control circuitry 122 then determines a new size for the reserved list area 210 based on the list size of the defective sector list 230 and the size of a future defective sector list 240. The control circuitry 122 then checks if the new size is less than the current size of the reserved list area 210 at step (412). If the new size is greater than the current size, the process ends at step (420). If the new size is less than the current size, there is unused buffer space in the reserved list area 210 that can be utilized in the reserved user area 220 and the process continues at step (414).

At step (414), the control circuitry 122 reduces the reserved list area 210 based on the new size of the reserved list area 210. The control circuitry 122 then moves the defective sector list 230 upward to the resized reserved list area 210 at step (416). Other embodiments may move the defective sector list downward depending on the address location of the reserved user area 220. The reserved list area 210 is moved to consolidate the reserved user area 220 into contiguous blocks. At step (418), the control circuitry 122 enlarges the reserved user area 220 based on the new size of the reserved list area 210. The process ends at step (420) with an enlarged, contiguous reserved user area 220.

It is advantageous for all the space for read, write, and caching operations to be contiguous. The reason for this is that caching algorithms often dynamically allocate segment sizes based on the sizes of incoming commands and other factors. In addition, the typical, simplest, and lowest cost hardware only works with data segments that have contiguous blocks. Thus, by having contiguous blocks, a larger segment can be used and the caching algorithms can be simplified.

Figure 5:
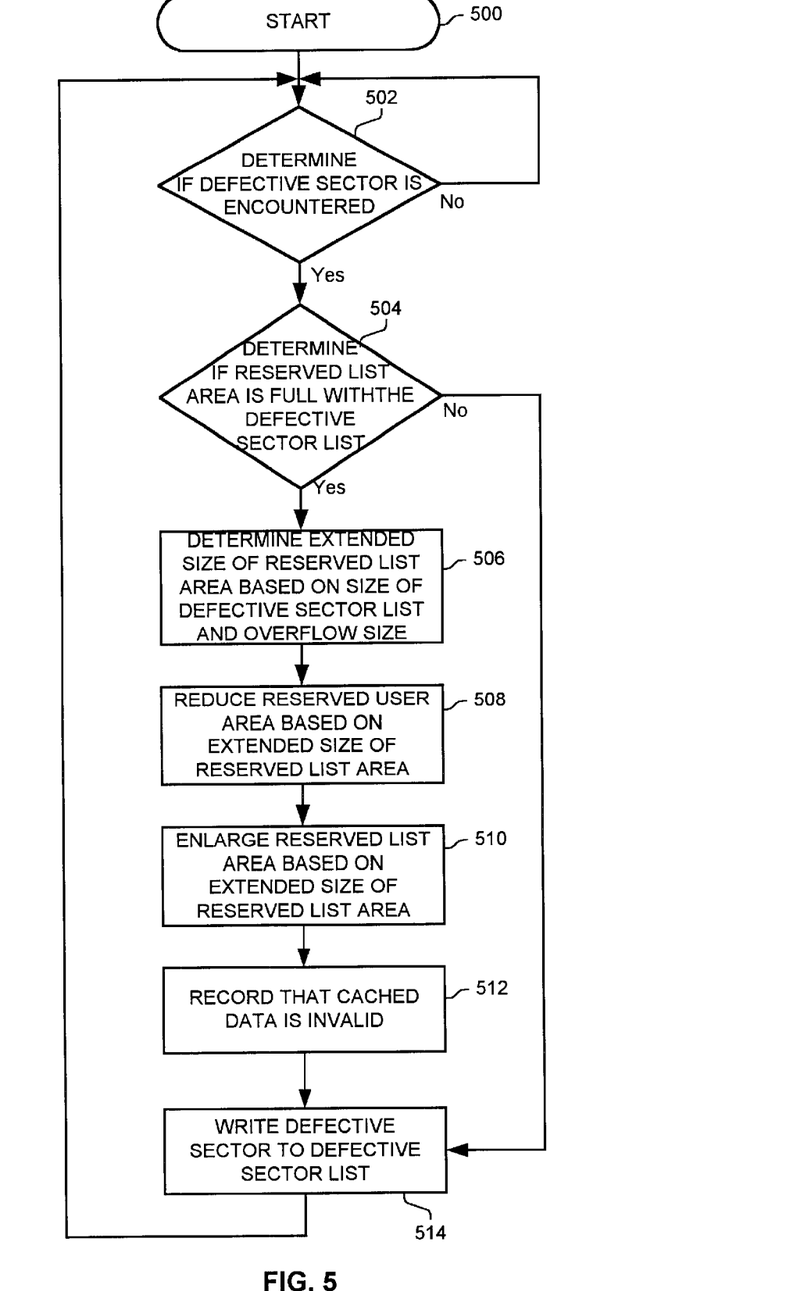
FIG. 5 is a flow chart of one embodiment of the invention for an overflow of the defective sector list in an example of the invention.

Overflow of Defective Sector List—FIG. 5

FIG. 5 illustrates the operational steps of processing an overflow of the defective sector list 230 in accord with one embodiment of the present invention. The process begins at step (500). At step (502), the control circuitry 122 determines if a new defective sector that is not in the defective sector list 230 has been encountered. If the defective sector is in the defective sector list 230, then the normal disk operation processing continues checking for defective sectors at step (502). If a new defective sector needs to be added to the defective sector list 230, the control circuitry 122 then checks if the reserved list area 210 is completely filled with the defective sector list 230 at step (504). If the reserved list area 210 is not filled, the defective sector is written to the defective sector list 230 at step (514). If the defective sector list 230 is filled, the reserved list area 210 needs to be enlarged to accommodate for new defective sectors beginning with step (506).

At step (506), the control circuitry 122 determines an extended size of the reserved list area 210 based on the size of the defective sector list 230 and an overflow size. The overflow size is the additional buffer space that should be reserved in the reserved list area 210 in the event of the reserved list area 210 being completely filled with the defective sector list 230. The overflow size can be programmable or user defined. The control circuitry 122 then reduces the reserved user area 220 based on the extended size of the reserved list area 210 at step (508). At step (510), the control circuitry 122 enlarges the reserved list area 210 based on the extended size of the reserved list area 210. At step (512), the control circuitry 122 records that the cached data is invalid due to the reduction of the reserved user area 220 in step (508). The control circuitry 122 then writes the defective sector to the defective sector list 230 at step (514). The reserved list area 210 is enlarged to accommodate for newly discovered defective sectors, and the process continues at step (502) with the normal disk operation processing that checks for defective sectors.

Those skilled in the art will appreciate variations of the above-described embodiments that fall within the scope of the invention. As a result, the invention is not limited to the specific examples and illustrations discussed above, but only by the following claims and their equivalents.

The invention claimed is:

1. A method for operating a disk drive system that stores user data, the method comprising:
   determining a list size of a defective sector list stored in a reserved list area in a buffer;
   determining a new size of the reserved list area based on the list size of the defective sector list;
   reducing the reserved list area based on the new size of the reserved list area; and
   enlarging a reserved user area in the buffer based on the new size of the reserved list area wherein the reserved user area stores the user data.

2. A method as defined in claim 1, further including reserving in the buffer the reserved list area for the defective sector list and the reserved user area for the user data.

3. A method as defined in claim 1, further including:
   transferring the defective sector list from the disk device to the buffer; and
   storing the defective sector list into the reserved list area in the buffer.

4. A method as defined in claim 1, wherein determining the new size of the reserved list area further includes determining the new size of the reserved list area based on the size of the defective sector list and a future defective sector list.

5. A method as defined in claim 1, further including determining if the new size of the reserved list area is less than a current size of the reserved list area and wherein reducing and enlarging is in response to a positive determination that the new size of the reserved list area is less than the current size of the reserved list area.

6. A method as defined in claim 1, wherein enlarging the reserved user area in the buffer further comprises consolidating the reserved user area.

7. A method as defined in claim 1, further including:
   determining if a defective sector is encountered;
   determining if the reserved list area is filled with the defective sector list;

responsive to a positive determination that the defective sector is encountered and the reserved list area is filled with the defective sector list, determining an extended size of the reserved list area based on the size of the defective sector list and an overflow size;

reducing the reserved user area based on the extended size of the reserved list area;

enlarging the reserved list area based on the extended size of the reserved list area; and writing the defective sector to the defective sector list.

8. A method as defined in claim 7, further including recording that the data in the reserved user area is invalid.

9. A processor-readable medium having instructions for performing a method for operating a disk drive system that stores user data, the method comprising:

determining a list size of a defective sector list stored in a reserved list area in a buffer;

determining a new size of the reserved list area based on the list size of the defective sector list;

reducing the reserved list area based on the new size of the reserved list area; and enlarging a reserved user area in the buffer based on the new size of the reserved list area wherein the reserved user area stores the user data.

10. A processor-readable medium as defined in claim 9, the method further including reserving in the buffer the reserved list area for the defective sector list and the reserved user area for the user data.

11. A processor-readable medium as defined in claim 9, the method further including:

transferring the defective sector list from the disk device to the buffer; and storing the defective sector list into the reserved list area in the buffer.

12. A processor-readable medium as defined in claim 9, wherein determining the new size of the reserved list area further includes determining the new size of the reserved list area based on the size of the defective sector list and a future defective sector list.

13. A processor-readable medium as defined in claim 9, the method further including determining if the new size of the reserved list area is less than a current size of the reserved list area and wherein reducing and enlarging is in response to a positive determination that the new size of the reserved list area is less than the current size of the reserved list area.

14. A processor-readable medium as defined in claim 9, wherein enlarging the reserved user area in the buffer further includes consolidating the reserved user area.

15. A processor-readable medium as defined in claim 9, the method further including:

determining if a defective sector is encountered;

determining if the reserved list area is filled with the defective sector list;

responsive to a positive determination that the defective sector is encountered and the reserved list area is filled with the defective sector list, determining an extended size of the reserved list area based on the size of the defective sector list and an overflow size;

reducing the reserved user area based on the extended size of the reserved list area;

enlarging the reserved list area based on the extended size of the reserved list area; and writing the defective sector to the defective sector list.

16. A processor-readable medium as defined in claim 15, further including recording that the data in the reserved user area is invalid.

17. A disk drive processing system that maximizes buffer usage, the disk drive processing system comprising:

instructions to determine a list size of a defective sector list stored in a reserved list area in a buffer, determine a new size of the reserved list area based on the list size of the defective sector list, reduce the reserved list area based on the new size of the reserved list area, and enlarge a reserved user area in the buffer based on the new size of the reserved list area wherein the reserved user area stores the user data;

a processor operational to execute the instructions; and a memory operational to store the instructions.

18. A disk drive processing system as defined in claim 17, wherein the instructions further include instructions to reserve in the buffer the reserved list area for the defective sector list and the reserved user area for the user data.

19. A disk drive processing system as defined in claim 17, wherein the instructions further include instructions to:

transfer the defective sector list from the disk device to the buffer; and store the defective sector list into the reserved list area in the buffer.

20. A disk drive processing system as defined in claim 17, wherein the instructions to determine the new size of the reserved list area further includes instructions to determine the new size of the reserved list area based on the size of the defective sector list and a future defective sector list.

21. A disk drive processing system as defined in claim 17, wherein the instructions further include instructions to determine if the new size of the reserved list area is less than a current size of the reserved list area and wherein the instructions to reduce and the instructions to enlarge are performed in response to a positive determination that the new size of the reserved list area is less than the current size of the reserved list area.

22. A disk drive processing system as defined in claim 17, wherein the instructions to enlarge the reserved user area in the buffer further include instructions to consolidate the reserved user area.

23. A disk drive processing system as defined in claim 17, wherein the instructions further include instructions to:

determine if a defective sector is encountered;

determine if the reserved list area is filled with the defective sector list;

responsive to a positive determination that the defective sector is encountered and the reserved list area is filled with the defective sector list, determine an extended size of the reserved list area based on the size of the defective sector list and an overflow size;

reduce the reserved user area based on the extended size of the reserved list area;

enlarge the reserved list area based on the extended size of the reserved list area; and write the defective sector to the defective sector list.

24. A disk drive processing system as defined in claim 23, wherein the instructions further include instructions to record that the data in the reserved user area is invalid.

25. A method of operating a disk drive system that stores user data, the method comprising:

initially providing a reserved area in a buffer for a defect list, the initially provided reserved area being of a predetermined size corresponding to a maximum possible size for the defect list;

writing the defect list from the disk drive into the reserved area in the buffer;

determining the size of the defect list in the buffer;

determining a new size for the reserved area based on the size of the defect list; and adjusting the size of the reserved area to the new size.

26. A method as defined in claim 25, wherein the operation of adjusting includes reducing the size of the reserved area.

27. A method as defined in claim 25, wherein the new size determined is the size of the defect list plus a spare area of predetermined size.

28. A method as defined in claim 27, wherein the size of the spare area is programmable.

29. A method as defined in claim 25, further including moving the newly sized reserve area to one end of the buffer.

* * * * *